Dec. 21, 1965          R. CURTIS ETAL          3,224,334
                    RETROFIT LUGS FOR BOMBS
                      Filed Feb. 5, 1964
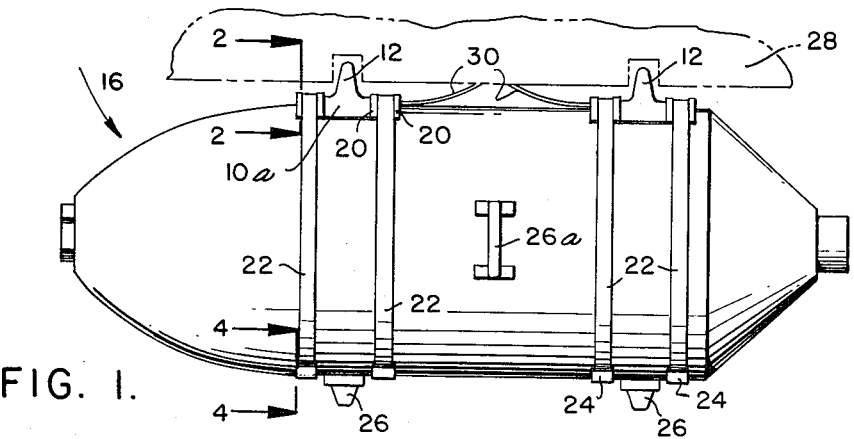
FIG. 1.
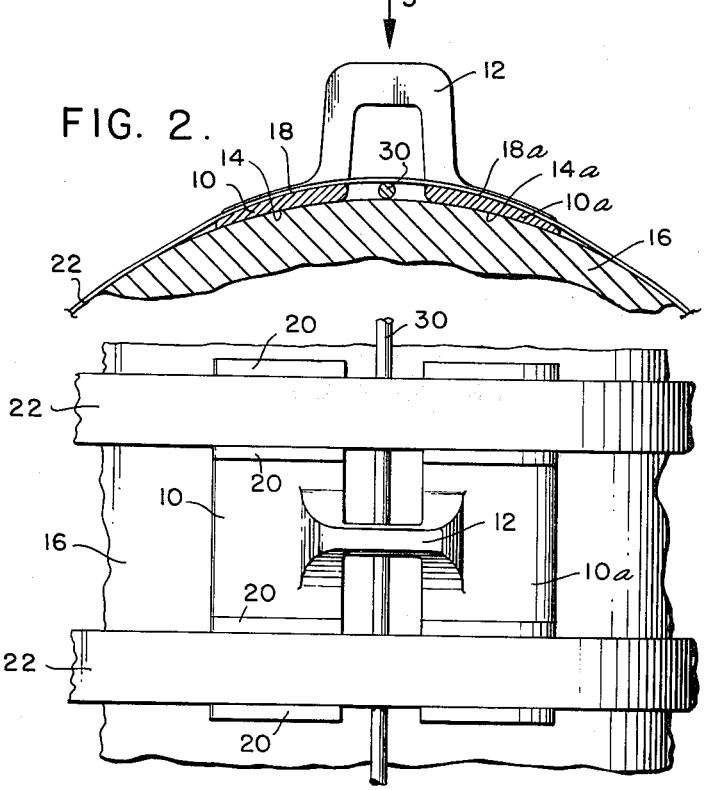
FIG. 2.
FIG. 3.
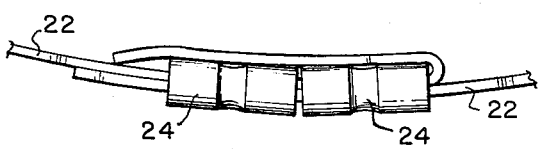
FIG. 4.
INVENTORS.
ROMAN CURTIS
EUGENE J. THIRKILL
BY
ATTORNEY.

United States Patent Office 3,224,334
Patented Dec. 21, 1965

3,224,334
RETROFIT LUGS FOR BOMBS
Roman Curtis, Granada Hills, and Eugene J. Thirkill, Whittier, Calif., assignors to the United States of America as represented by the Secretary of the Navy
Filed Feb. 5, 1964, Ser. No. 342,835
2 Claims. (Cl. 89—1.5)
(Granted under Title 35, U.S. Code (1952), sec. 266)

The invention described herein may be manufactured and used by or for the Government of the United States of America for governmental purposes without the payment of any royalties thereon or therefor.

This invention relates to aircraft carried bombs and more particularly to improvements in suspension lugs for releasably securing bombs to aircraft bomb racks.

It has long been conventional practice to releasably carry bombs on aircraft by bomb racks affixed to the aircraft. Such racks are usually provided with a pair of spaced movable hooks, each hook releasably engaging the eye of a suspension lug affixed to a bomb. The patent to C. A. Caya, No. 2,852,981, is exemplary of such type of bomb rack.

A surplus of a certain type of 250 lb. bomb, still serviceable for the intended purpose, has existed since the termination of World War II, which is provided with suspension lugs proportioned to fit bomb racks then in use. Such bomb racks have more recently been superseded, however, by a new design which is dimensionally different from the earlier bomb rack and hence the surplus bombs cannot be carried by the bomb racks of the new design now in use. The lugs, moreover, having been designed for aircraft of World War II, would be overstressed if used with present day military aircraft which produce greater acceleration forces on the lugs. It becomes apparent, accordingly, that if the surplus bombs could be modified to be carried by the bomb racks now in use, considerable savings in armament costs could be effected. The suspension lugs of the surplus bombs are welded to the cylindrical bomb casings and, while it would not be necessary to remove them, the problem arises as to how to best add new and stronger suspension lugs which will fit the present bomb racks. Welding of new lugs to the bomb casings cannot be done without unloading the explosive, due to the obvious hazards of applying heat; and unloading, welding of new lugs and reloading is economically impractical due to logistic and other considerations.

The principal object of the invention is to provide an economical, practical, and otherwise acceptable lug construction which can be attached to bombs to adapt them to be carried by a bomb rack other than the bomb rack for which they were originally intended.

Another object is to provide a lug construction which can be applied to the bombs at their situs and with simple readily available tools, thereby obviating logistic problems involved in transportation of bombs from one situs to another.

Further objects, advantages and salient features will become more apparent from a consideration of the description to follow, the appended claims and the accompanying drawing in which:

FIG. 1 is a side elevation of the subject of the invention;

FIG. 2 is an enlarged section taken on line 2—2, FIG 1;

FIG. 3 is a top plan as viewed in the direction of arrow 3, FIG. 2; and

FIG. 4 is an enlarged section taken on line 4—4, FIG. 1.

Prior to the adoption of the specific lug to be subsequently described, various constructions were considered for their feasibility. Among these included a construction comprising an elongated bar to which was secured a pair of threaded eye members adjacent its ends for engaging the bomb rack hooks. The bar was secured to the bomb by a pair of spaced circumferential split bands, each of which was drawn together by a tensioning bolt. The excessive weight, excessive height of the eye members and costly machine work rendered this design impractical. Another was of the toggle clamping breakaway type employed with torpedoes. This was also found to be unacceptable since the toggle latch caused interference with the bomb rack. Another, and probably the most closely related prototype of the construction finally adopted, consisted of a forged plate having an integral upstanding eyed lug at its center, the plate being secured to the bomb by a pair of split or Marmon type clamps extending around the bomb and engaging the plate fore and aft of the lug. This also had disadvantages, one of which was the difficulty to forge it. During this development in search of an acceptable design, it became apparent that the ideal lug construction should be of forged steel, would require no subsequent machine work, should project a minimum distance from the outer surface of the bomb and that it be secured to the bomb by encircling bands, devoid of clamp bolts or other excessive projections.

Referring now to the drawing, the lug construction found to meet the requirements which obviated the disadvantages of the earlier developed and rejected designs comprises a pair of spaced substantially rectangular plates 10, 10a which are joined together in spaced parallel relation by a U-shaped eye 12, the plates and eye being forged from a single blank of steel. The inner surfaces 14, 14a are curved to cylindrical shape to fit the curvature of bomb 16 and outer surfaces 18, 18a are of like shape but tapered in cross section, as best shown in FIG. 2. These surfaces are bounded along their circumferential edges by raised ribs 20, 20 which prevent the attaching bands 22 from moving longitudinally relative to the lug.

The attaching bands are of thin steel, used for banding packages and the like which are locked together by one or more couplings or seal members 24 which are distorted or crimped into the band while it is being tensioned by tools available for this purpose. The bands, seal members, tensioning and crimping tools are all commercially available, and well known in the packaging art.

The welded suspension lugs 26, previously referred to, are longitudinally spaced the same distance as the bomb rack hooks (not shown) of the new design of bomb rack 28, but are dimensionally different from the lugs or eye members 12, 12 so that they will not fit the bomb rack 28. While they become redundant as suspension members when lugs 12, 12 are attached, they serve as abutments to prevent relative longitudinal movement between the bands and the bomb since each pair of bands encircle the bomb adjacent opposite ends of a lug 26. Lug 26a, also a welded lug, which was formerly employed as an alternative suspension from some bomb racks, becomes entirely redundant.

As best shown in FIG. 2, each band 22, at its uppermost portion, is spaced from the bomb, through which extends, longitudinally, an arming wire 30 which upon release of the bomb causes it to become armed. As compared with the former suspension by welded lugs it has been discovered that breakage of arming wires has been reduced. This is believed attributable to bands 22 which probably undergo variation in tension under vibration thus absorbing energy which the extremely rigid welded lugs could not absorb.

As illustrated, the inner surfaces 14, 14a of plates 10, 10a are shaped to fit a bomb of predetermined diameter.

The same integrally forged lug may, however, be constructed to fit bombs of other diameters by a final forging step which forges or bends plates 10, 10a to the desired shape.

Obviously many modifications and variations of the present invention are possible in the light of the above teachings. It is therefore to be understood that within the scope of the appended claims the invention may be practiced otherwise than as specifically described.

What is claimed is:

1. Apparatus for suspending an elongated bomb from an aircraft bomb rack having a pair of longitudinally spaced suspension hooks for releasably engaging a pair of longitudinally spaced suspension lugs extending upwardly from the top of said bomb, said suspension lugs each comprising;
   (a) a unitary integrally forged steel member formed of a pair of like rectangular elongated substantially flat plate members disposed in spaced apart parallel relation,
   (b) said plate members being joined together solely midway between their longitudinally spaced ends by the ends of the legs of an inverted U-shaped member adapted to releasably engage a bomb rack hook,
   (c) said plate members and U-shaped member being H-shaped as viewed in a plane perpendicular to the longitudinal axis of the bomb; and
   (d) a pair of tensioned bands extending completely around the bomb and over the plates, the bands being longitudinally spaced, one at each side of the U-shaped member, each band being formed of a single strip of metal having a uniform rectangular cross section throughout its length,
   (e) the construction and arrangement being such that the lugs and their attaching bands remain affixed to the bomb when the lugs are released from said hooks.

2. Apparatus in accordance with claim 1 in combination with a bomb having
   (f) a pair of longitudinally spaced suspension lugs welded to the bomb, each pair of suspension bands encircling the bomb adjacent opposite longitudinally spaced ends of a preexisting welded suspension lug, the welded lug preventing relative longitudinal movement of a band relative to the bomb.

References Cited by the Examiner

UNITED STATES PATENTS

| | | | |
|---|---|---|---|
| 2,314,942 | 3/1943 | Hinchcliff | 102—1 |
| 2,354,039 | 7/1944 | Mitchell | 102—2 X |
| 2,789,469 | 4/1957 | Fisher et al. | 89—1.5 |
| 3,093,031 | 6/1963 | Damm | 89—1.5 |

BENJAMIN A. BORCHELT, *Primary Examiner.*

SAMUEL W. ENGLE, *Examiner.*